United States Patent
Song et al.

(10) Patent No.: US 11,953,903 B2
(45) Date of Patent: Apr. 9, 2024

(54) NEURAL NETWORK-BASED METHOD FOR CALIBRATION AND LOCALIZATION OF INDOOR INSPECTION ROBOT

(71) Applicants: CHONGQING UNIVERSITY, Chongqing (CN); STAR INSTITUTE OF INTELLIGENT SYSTEMS, Chongqing (CN); DB (CHONGQING) INTELLIGENT TECHNOLOGY RESEARCH INSTITUTE CO., LTD., Chongqing (CN)

(72) Inventors: Yongduan Song, Chongqing (CN); Jie Zhang, Chongqing (CN); Junfeng Lai, Chongqing (CN); Huan Liu, Chongqing (CN); Ziqiang Jiang, Chongqing (CN); Li Huang, Chongqing (CN)

(73) Assignees: Chongqing University, Chongqing (CN); Star Institute of Intelligent Systems, Chongqing (CN); DB (Chongqing) Intelligent Technology Research Institute Co., LTD, Chongqing (CN)

( * ) Notice: Subject to any disclaimer, the term of this patent is extended or adjusted under 35 U.S.C. 154(b) by 293 days.

(21) Appl. No.: 17/589,179

(22) Filed: Jan. 31, 2022

(65) Prior Publication Data
US 2022/0350329 A1 Nov. 3, 2022

(30) Foreign Application Priority Data
Apr. 25, 2021 (CN) .......................... 202110448691.1

(51) Int. Cl.
*G05D 1/00* (2006.01)
*G06N 3/084* (2023.01)
*H04B 17/318* (2015.01)

(52) U.S. Cl.
CPC ......... *G05D 1/0088* (2013.01); *G05D 1/0272* (2013.01); *G05D 1/028* (2013.01);
(Continued)

(58) Field of Classification Search
CPC .......... G05D 1/00; G05D 1/02; H04B 17/318; G06N 3/08
See application file for complete search history.

(56) References Cited

U.S. PATENT DOCUMENTS

| | | | |
|---|---|---|---|
| 11,675,359 B2* | 6/2023 | Towal | G06T 7/60 701/23 |
| 2004/0158358 A1* | 8/2004 | Anezaki | G05D 1/0221 700/264 |

(Continued)

*Primary Examiner* — Tan Q Nguyen
(74) *Attorney, Agent, or Firm* — Hunton Andrews Kurth LLP

(57) ABSTRACT

The present disclosure provides a neural network-based method for calibration and localization of an indoor inspection robot. The method includes the following steps: presetting positions for N label signal sources capable of transmitting radio frequency (RF) signals; computing an actual path of the robot according to numbers of signal labels received at different moments; computing positional information moved by the robot at a $t^{th}$ moment, and computing a predicted path at the $t^{th}$ moment according to the positional information; establishing an odometry error model with the neural network and training the odometry error model; and inputting the predicted path at the $t^{th}$ moment to a well-trained odometry error model to obtain an optimized predicted path. The present disclosure maximizes the localization accuracy for the indoor robot by minimizing the error of the odometer with the odometry calibration method.

4 Claims, 4 Drawing Sheets

(52) U.S. Cl.
CPC ........... *G06N 3/084* (2013.01); *H04B 17/318* (2015.01); *G05D 2201/0207* (2013.01)

(56) References Cited

U.S. PATENT DOCUMENTS

2017/0276501 A1\* 9/2017 Wise .................... G05D 1/0274
2022/0080600 A1\* 3/2022 Kearns ................... G01S 17/93

\* cited by examiner

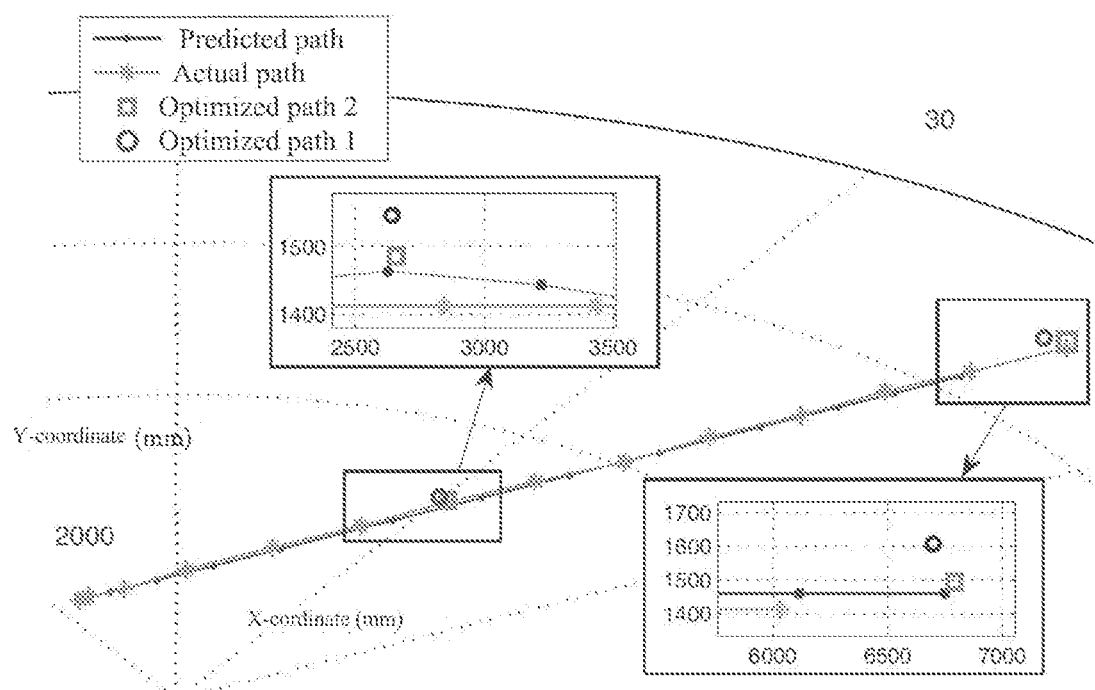
FIG. 3-a

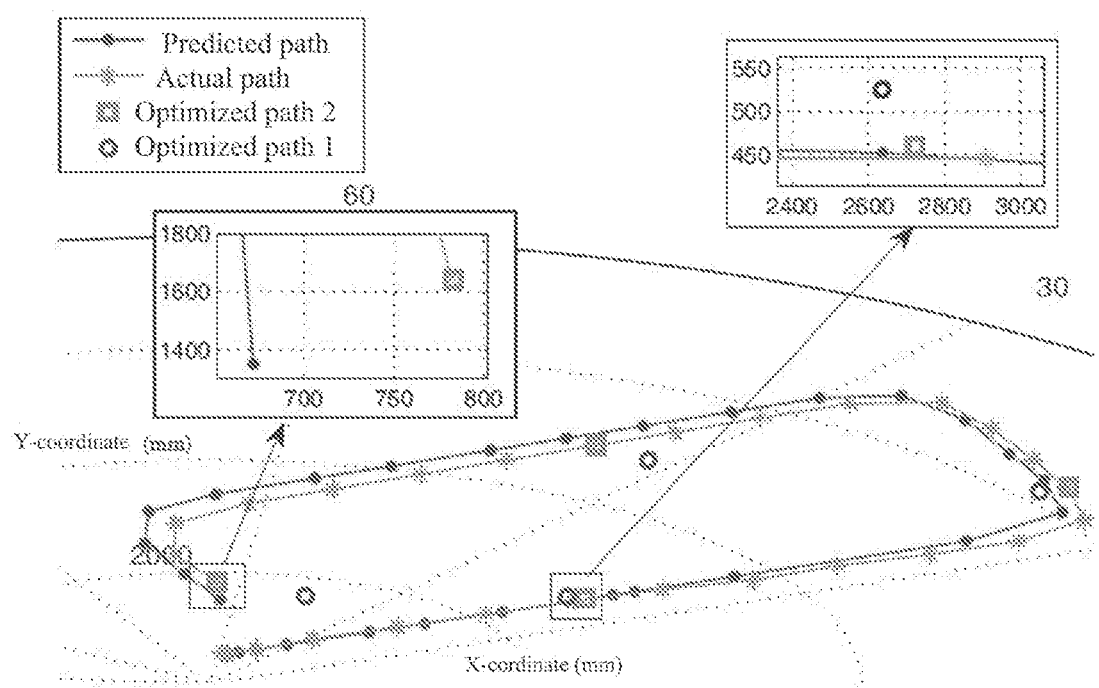
FIG. 3-b

NEURAL NETWORK-BASED METHOD FOR CALIBRATION AND LOCALIZATION OF INDOOR INSPECTION ROBOT

CROSS REFERENCE TO RELATED APPLICATION(S)

This patent application claims the benefit and priority of Chinese Patent Application No. 202110448691.1, filed on Apr. 25, 2021, the disclosure of which is incorporated by reference herein in its entirety as part of the present application.

TECHNICAL FIELD

The present disclosure relates to the field of inspection robots, and in particular, to a neural network-based method for calibration and localization of an indoor inspection robot.

BACKGROUND ART

Safe production is the premise and important assurance for stable development of enterprises. Once a safety accident happens, it would cause casualties and property losses to seriously restrict the rapid and sound development of enterprises. Particularly in hazardous working environments such as nuclear power stations, steelworks, chemical plants, oil depots and substations, the safe production depends on the safe and stable operation of various devices and instruments, and thus the regular and continuous inspection is very necessary. At present, the hazardous working environments such as substations and oil depots are mainly inspected manually, specifically, devices and instruments in plants are inspected based on sensory organs of workers and by reading meters, making records and adopting some assorted detectors. Due to various external factors, the manual inspection is faced with the undesirable inspection quality and the low inspection efficiency. In order to improve the inspection efficiency, and ensure the safe and reliable operation of the devices and instruments, it has been a trend to replace a part of the manual inspection with an automatic inspection robot.

However, localization for the inspection robot in plants is an arduous task for various reasons. On the basis of the widespread use of vision, the odometer as a proprioceptive sensor of the robot inevitably accumulates trajectory error over time and distance. Concerning existing odometry localization methods for the indoor inspection robot, the odometer has a large computational error due to complicated indoor environmental factors as well as systematic and non-systematic factors.

SUMMARY

In view of the above problems in the prior art, the present disclosure is intended to solve the technical problem that the odometer in existing odometry localization methods for the indoor inspection robot has a large error due to complicated indoor environmental factors.

To solve the above-mentioned technical problem, the present disclosure employs the following technical solutions. A neural network-based method for calibration and localization of an indoor inspection robot includes the following steps:

S100: presetting indoor positions for N label signal sources, the label signal sources being capable of transmitting radio frequency (RF) signals;

S200: providing a reader-writer for receiving the signals of the label signal sources on an indoor robot, and computing, during an indoor traveling process of the robot, an actual path of the robot according to numbers of signal labels received by the reader-writer at different moments, specifically:

S210: establishing a log-normal propagation loss model according to a signal strength of received labels:

$$P(d)=P(d_0)-10\alpha \log(d/d_0)-x_\sigma \qquad (2\text{-}1)$$

where, $P(d)$ represents a signal strength from labels received by a reader, $P(d_0)$ represents a signal strength from labels received by the reader at a reference point $d_0$, $\alpha$ represents a scale factor between a path length and a path loss, $X_\sigma$ represents a Gaussian random variable having an average of 0, $d_0$ represents a distance from the reference point to each of the labels, and $d$ represents a distance from a label to be computed to the reader;

S220: obtaining a distance $d$ from each of the label signal sources to the reader-writer by transforming eq. (2-1):

$$d=10^{[P(d_0)-P(d)]/10\alpha} \qquad (2\text{-}2)$$

where, $P(d_0)$ represents a signal strength at 1 m, and $\alpha$ represents a signal propagation constant;

S230: randomly selecting I moments within a time interval T, and assuming that a number of label signals received by the reader-writer at a $t^{th}$ moment is n, then computing an actual coordinate of the robot at the $t^{th}$ moment as:

$$\hat{X}_t = \begin{bmatrix} x(t) \\ y(t) \end{bmatrix} = \begin{bmatrix} \frac{8\times(NK_1E_{x1}-KK_1E_{y1}+NK_2E_{x2}-KK_2E_{y2}+\ldots+NK_nE_{xn-1}-KK_nE_{yn-1})}{MN-K^2}+v\cos\theta(\bar{t}) \\ \frac{8\times(MK_1E_{y1}-KK_1E_{x1}+MK_2E_{y2}-KK_2E_{x2}+\ldots+MK_nE_{yn-1}-KK_nE_{xn-1})}{MN-K^2}+v\sin\theta(\bar{t}) \end{bmatrix} \qquad (2\text{-}3)$$

where, $E_{x1}=x_1-x_n, E_{x2}=x_2-x_n, \ldots, E_{xn-1}=x_{n-1}-x_n;$ $E_{y1}=y_1-y_n, E_{y2}=y_2-y_n, \ldots, E_{yn-1}=y_{n-1}-y_n;$ $K=(x_1-x_n)(y_1-y_n)+(x_2-x_n)(y_2-y_n)+\ldots+(x_{n-1}-x_n)(y_{n-1}-y_n);$ $K_1=x_1^2-x_4^2+y_1^2-y_4^2+d_4^2-d_1^2;$ $K_2=x_2^2-x_4^2+y_2^2-y_4^2+d_4^2-d_2^2;$ $K_n=x_{n-1}^2-x_n^2+y_{n-1}^2-y_n^2+d_n^2-d_{n-1}^2;$ $M=(x_1-x_4)^2+(x_2-x_4)^2+\ldots+(x_{n-1}-x_n)^2;$ $$N=(y_1-y_4)^2+(y_2-y_4)^2+\ldots+(y_{n-1}-y_n)^2;$$

S240: establishing a model with coordinates of the robot in the I moments to obtain an actual path of the robot:

$$RSSI=\{RSSI_x,RSSI_y\}=\{x_1',x_2',\ldots,x_n',y_1',y_2',\ldots,y_n'\} \quad (2\text{-}4)$$

where, $RSSI=\{RSSI_x,RSSI_y\}$ represents the actual path of the robot, and $RSSI_x$ and $RSSI_y$ represent an x coordinate and a y coordinate computed through RF identification (RFID)-based localization; and S250: obtaining an actual path of the robot in the I moments with the method in S210-S240;

S300: computing positional information moved by the robot at the $t^{th}$ moment:

$$f(S_t, u_{t-1}) = \begin{cases} x_t + \dfrac{\Delta D_t}{\Delta \theta_t}[\sin(\theta_t + \Delta\theta_t) - \sin\theta_t] \\ y_t - \dfrac{\Delta D_t}{\Delta \theta_t}[\cos(\theta_t + \Delta\theta_t) - \cos\theta_t] \\ \theta_t + \Delta\theta_t \end{cases}, |\Delta\theta_t| > 0 \quad (3\text{-}1)$$

where, $u_t=(\Delta D_t, \Delta\theta_t)^T$ represents a pose increment, $S_t=(x_t, y_t, \theta_t)$ represents a state of the robot at the $t^{th}$ moment, $(x,y)$ represents a coordinate of the robot at the $t^{th}$ moment, $\theta$ represents a direction angle at the $t^{th}$ moment, $\Delta D_t$ is an arc length moved by the robot within time $\Delta t$, and $\Delta\theta_t$ is a change of a direction angle in a pose of the robot within the time $\Delta t$;

S400: processing the positional information of the robot at the $t^{th}$ moment in step S300 with a generalized linear model (GLM) to obtain a predicted path of the robot at the $t^{th}$ moment:

$$GLM=\{x_1,x_2,\ldots,x_n,y_1,y_2,\ldots,y_n\} \quad (4\text{-}1)$$

where, $x_{1\ldots n}$ is an x coordinate of the predicted path estimated by the GLM, and $y_{1\ldots n}$ is a y coordinate of the predicted path estimated by the GLM, thereby obtaining a predicted path corresponding to each moment;

S500: establishing an odometry error model with the neural network:

$$E=\Sigma_n|O-RSSI|^2 \quad (5\text{-}1)$$

where, O represents an optimized predicted path;

S600: presetting a maximum number of iterations, taking the actual path in the I moments and a corresponding predicted path as an input of a neural network model to train the error model E, updating parameters of the model through back propagation (BP) during training, and stopping training when $E \le e^{-5}$ to obtain a well-trained odometry error model; and S700: repeating steps S300-S400 to obtain a predicted traveling path of a robot R' to be predicted, and inputting the predicted traveling path to the well-trained odometry error model in step S600 to obtain an optimized predicted traveling path that is a predicted value for the traveling path of the robot R'.

Preferably, the computing an actual coordinate of the robot at the $t^{th}$ moment in step S230 may specifically include:

S231: assuming that the inspection robot R provided with the reader-writer has a coordinate of (x,y), and coordinates of the n label signal sources are $(x_1,y_1)$ $(x_2,y_2)$ $(x_3,y_3), \ldots, (x_n,y_n)$:

$$\begin{cases} (x_1-x)^2 + (y_1-y)^2 = d_1^2 \\ (x_2-x)^2 + (y_2-y)^2 = d_2^2 \\ (x_3-x)^2 + (y_3-y)^2 = d_3^2 \\ \ldots \\ (x_n-x)^2 + (y_n-y)^2 = d_n^2 \end{cases} \quad (2\text{-}5)$$

where, $d_1, d_2, d_3, \ldots, d_n$ represent distances from the label signal sources to the inspection robot R, respectively;

S232: substituting eq. (2-4) into eq. (2-5) to obtain:

$$\begin{cases} x_1^2 - x_n^2 - x(x_1-x_n)x + y_1^2 - y_n^2 - 2(y_1-y_n)y = d_1^2 - d_n^2 \\ x_2^2 - x_n^2 - x(x_2-x_n)x + y_2^2 - y_n^2 - 2(y_2-y_n)y = d_2^2 - d_n^2 \\ \ldots \\ x_{n-1}^2 - x_n^2 - x(x_{n-1}-x_n)x + y_{n-1}^2 - y_n^2 - 2(y_{n-1}-y_n)y = d_{n-1}^2 - d_n^2 \end{cases} \quad (2\text{-}6)$$

representing eq. (2-6) with a linear equation as:

$$AX=b \quad (2\text{-}7)$$

where:

$$A = \begin{bmatrix} 2(x_1-x_n)2(y_1-y_n) \\ 2(x_2-x_n)2(y_2-y_n) \\ \ldots \\ 2(x_{n-1}-x_n)2(y_{n-1}-y_n) \end{bmatrix}, b = \begin{bmatrix} x_1^2 - x_n^2 + y_1^2 - y_n^2 + d_n^2 - d_1^2 \\ x_2^2 - x_n^2 + y_2^2 - y_n^2 + d_n^2 - d_2^2 \\ x_{n-1}^2 - x_n^2 + y_{n-1}^2 - y_n^2 + d_n^2 - d_{n-1}^2 \end{bmatrix}, X = \begin{bmatrix} x \\ y \end{bmatrix}$$

S233: processing eq. (2-7) with a standard least squares estimation method to obtain:

$$J=[b-A\hat{X}]^T[b-A\hat{X}]=[b^T-\hat{X}^TA^T][b-A\hat{X}] \quad (2\text{-}8)$$

where, A is a non-singular matrix; M>2, namely an overdetermined system in which a number of equations is greater than a number of unknowns; a reciprocal of $\hat{X}$ is obtained with eq. (2-8); and $X^TA^Tb=b^TA\hat{X}$ leads to:

$$\frac{\partial J}{\partial \hat{X}} = \frac{[b^Tb - 2\hat{X}^TA^Tb + \hat{X}^TA^TA\hat{X}]}{\partial \hat{X}} = -2A^Tb + 2A^TA\hat{X} = 0 \quad (2\text{-}9)$$

obtaining a predicted coordinate when the inspection robot read an nth label:

$$\hat{X}=(A^TA)^{-1}A^Tb \quad (2\text{-}10)$$

S234: computing an actual coordinate when the inspection robot reads the nth label, the actual coordinate being specifically given by:

$$\begin{cases} x(t) = x(\bar{t}) + v\cos\theta(\bar{t}) \\ y(t) = y(\bar{t}) + v\sin\theta(\bar{t}) \end{cases} \quad (2\text{-}11)$$

where, t represents the $t^{th}$ moment, and $\bar{t}$ represents a time mean from a $(t-1)^{th}$ moment to the $t^{th}$ moment; and S235: substituting eq. (2-7) into eq. (2-11) to obtain eq. (2-3), eq. (2-3) being the actual coordinate of the robot at the $t^{th}$ moment.

At a moment when the RF reader-writer on the robot acquire different numbers of label signals, different localization algorithms are generally used to acquire the actual path of the robot more accurately. Usually, a probabilistic localization method is used for two or less label signals, a trilateral localization method is used for three label signals, and a maximum likelihood localization method is used for four or more label signals. Different localization algorithms are used depending on different numbers of label signals, which can effectively reduce influences on errors from different amounts of input data.

Preferably, the computing positional information moved by the robot in step S300 may specifically include:

S310: computing a theoretical resolution of an odometer:

$$\delta = \frac{\pi D}{\eta P} = \frac{3.14 \times 250}{15 \times 360} = 0.14537 (mm) \quad (3-2)$$

where, $\delta$ represents the resolution of the odometer, D represents a diameter (mm) of a wheel, $\eta$ represents a reduction ratio of a drive motor, and P represents an accuracy of an encoder;

S320: assuming that a sampling interval is $\Delta t$, then computing a displacement increment $\Delta d_L$ ($\Delta d_R$) of a left (right) wheel:

$$\Delta d_L = \delta \cdot N_L \quad (3-3)$$

where, $N_L(N_R)$ represent a pulse increment output by a photoelectric encoder on the left (right) wheel;

S330: computing the pose increment of the robot with the displacement increment of the wheel:

$$\begin{cases} \Delta D_t = (\Delta d_L + \Delta d_R)/2 \\ \Delta \theta_t = (\Delta d_R - \Delta d_L)/\beta \end{cases} \quad (3-4)$$

where, $\beta$ represents a distance between the left drive wheel and the right drive wheel;

S340: obtaining, in case of a difference $|\Delta \theta_t| > 0$ between direction angles at an end pose and a start pose of the robot, the positional information of the robot.

Preferably, the establishing an odometry error model E in step S500 may specifically include:

S510: assuming that the neural network structurally includes an input layer having q neurons, a hidden layer having l neurons, and an output layer having m neurons, connections between the neurons of the input layer and the neurons of the hidden layer each have a weight value of $w_{ij}$, connections between the neurons of the hidden layer and the neurons of the output layer each have a weight value of $w_{jk}$, the hidden layer has a bias term of a, and the output layer has a bias term of b;

S520: taking the GLM as an input of the neural network to obtain an output result of the hidden layer:

$$H_i = f\left(\sum_{i=1}^{q} w_{ij} p_i - a_j\right) \quad j = 1, 2, \ldots, l \quad (5-2)$$

where, $p_i$ represents a vector for coordinates ($x_{n-1}, y_{n-1}$ and ($x_n, y_n$) of the input GLM, f represents an activation function, and i={1, 2, . . . , q}, j={1, 2, . . . , l}; and a result from the output layer of the neural network is:

$$O = \sum_{j=1}^{l} H_i w_{jk} - b_k = \{\hat{x}_1, \hat{x}_2, \ldots, \hat{x}_n, \hat{y}_1, \hat{y}_2, \ldots, \hat{y}_n\} \quad (5-5)$$

$$k = 1, 2, \ldots m$$

S530: taking the result from the output layer of the neural network at the $t^{th}$ moment and the actual path at the present moment as an input of a loss function to establish the odometry error model E.

This part is mainly intended to construct the odometry error model through the neural network. The neural network mainly includes two stages: forward propagation of the signal from the input layer to the hidden layer and to the output layer, and back propagation of the error. The neural network estimates an error for the directly previous layer of the output layer with the output error, and then estimates an error for the more previous layer with the present error, thereby implementing error estimation on all layers in the neural network; and through the loss function E, parameters of the neural network are obtained sequentially.

The disclosure has the following advantages over the prior art:

1. The odometry calibration method for an indoor inspection robot based on a neural network maximizes the localization accuracy by minimizing the odometry error.

2. The neural network method can be applied to any odometry model and high-speed working environment; and the method is irrelevant to the platform and does not need to provide the error variable of the odometer before model establishment.

3. The present disclosure is applied to common indoor environments for mapping and other tasks, and can also work well in complicated environments.

BRIEF DESCRIPTION OF THE DRAWINGS

FIG. 3-a illustrates a comparison between an actual path of a robot, a predicted path processed by a GLM, an optimized path 1 in neural network training and an optimized path 2 after the neural network training during a linear motion of the robot; and FIG. 3-b illustrates a comparison between an actual path of a robot, a predicted path processed by a GLM, an optimized path 1 in neural network training and an optimized path 2 after the neural network training during a nonlinear motion of the robot.

DETAILED DESCRIPTION OF THE EMBODIMENTS

The present disclosure will be further described below in detail.

Due to complicated environmental factors, localization of the inspection robot is a research bottleneck to be solved urgently. On the basis of the widespread use of vision, the self-contained odometer can predict the trajectory of the robot according to the kinematic model, and achieve the desirable localization within a short distance and short time. The robot can be accurately localized by optimizing the error of the odometer. The RFID-based indoor localization can serve as an auxiliary localization device for odometry optimization of the indoor inspection robot because of its unnecessity for manual intervention, strong anti-interference performance, and capability of working in various harsh environments.

Figure 1:
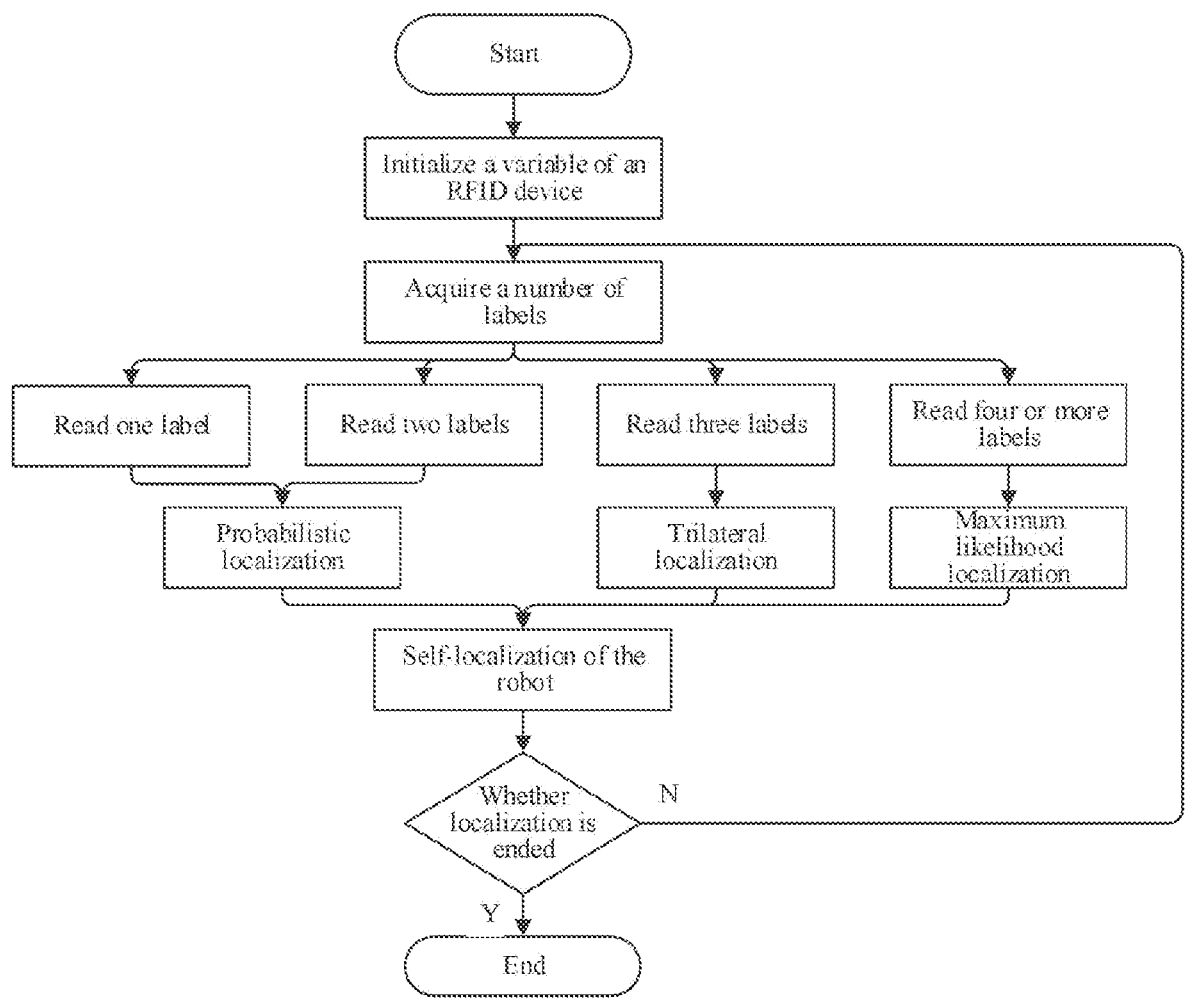
FIG. 1 is a flow chart of a localization algorithm in an RFID-based indoor localization technology.

Referring to FIG. 1, a neural network-based method for calibration and localization of an indoor inspection robot includes the following steps:

S100: Indoor positions for N label signal sources are preset, the label signal sources being capable of transmitting RF signals.

S200: A reader-writer for receiving the signals of the label signal sources is provided on an indoor robot, and during an indoor traveling process of the robot, an actual path of the robot is computed according to numbers of signal labels received by the reader-writer at different moments, specifically:

S210: A log-normal propagation loss model is established according to a signal strength of received labels. The signal strength of each label is a constant value, unless the reader keeps a different distance from the label. The attenuation in the strength is called the propagation loss of the signal. With theoretical and empirical propagation loss models, the propagation loss can be transformed into the distance:

$$P(d)=P(d_0)-10\alpha \log(d/d_0)-x_\sigma \qquad (2\text{-}1)$$

where, $P(d)$ represents a signal strength from labels received by a reader, $P(d_0)$ represents a signal strength from labels received by the reader at a reference point $d_0$, all labels having a same initial signal strength, $\alpha$ represents a scale factor between a path length and a path loss and depends on a structure and a material of an obstacle, $X_\sigma$ represents a Gaussian random variable having an average of 0, namely attenuation that the signal passes through the obstacle, $d_0$ represents a distance from the reference point to each of the labels, and represents a distance from a label to be computed to the reader.

S220: A distance d from each of the label signal sources to the reader-writer is obtained by transforming Eq. (2-1):

$$d=10^{[P(d_0)-P(d)]/10\alpha} \qquad (2\text{-}2)$$

where, $P(d_0)$ represents a signal strength from labels at 1 m, and $\alpha$ represents a signal propagation constant. As can be seen from Eq. (2-2), $P(d_0)$ and $\alpha$ determine the relationship between an RSS and a signal transmission distance, and both can be a constant once the service environment is determined.

S230: I moments are randomly selected within a time interval T, and assuming that a number of label signals received by the reader-writer at a $t^{th}$ moment is n, an actual coordinate of the robot at the $t^{th}$ moment is computed as:

$$\hat{X}_t = \begin{bmatrix} x(t) \\ y(t) \end{bmatrix} \qquad (2\text{-}3)$$

$$= \begin{bmatrix} \dfrac{8 \times \left( \begin{array}{c} NK_1E_{x1} - KK_1E_{y1} + NK_2E_{x2} - KK_2E_{y2} + \ldots + \\ NK_nE_{xn-1} - KK_nE_{yn-1} \end{array} \right)}{MN - K^2} + v\cos\theta(\bar{t}) \\ \dfrac{8 \times \left( \begin{array}{c} MK_1E_{y1} - KK_1E_{x1} + MK_2E_{y2} - KK_2E_{x2} + \ldots + \\ MK_nE_{yn-1} - KK_nE_{xn-1} \end{array} \right)}{MN - K^2} + v\sin\theta(\bar{t}) \end{bmatrix}$$

where, $E_{x1}=x_1-x_n, E_{x2}=x_2-x_n, \ldots, E_{xn-1}=x_{n-1}-x_n;$ $E_{y1}=y_1-y_n, E_{y2}=y_2-y_n, \ldots, E_{yn-1}=y_{n-1}-y_n;$ $K=(x_1-x_n)(y_1-y_n)+(x_2-x_n)(y_2-y_n)+ \ldots +(x_{n-1}-x_n)(y_{n-1}-y_n);$ $K_1=x_1^2-x_4^2+y_1^2-y_4^2+d_4^2-d_1^2;$ $K_2=x_2^2-x_4^2+y_2^2-y_4^2+d_4^2-d_2^2;$ $K_n=x_{n-1}^2-x_n^2+y_{n-1}^2-y_n^2+d_n^2-d_{n-1}^2;$ $M=(x_1-x_4)^2+(x_2-x_4)^2+ \ldots +(x_{n-1}-x_n)^2;$ $N=(y_1-y_4)^2+(y_2-y_4)^2+ \ldots +(y_{n-1}-y_n)^2;$ where, E, K, M and N are all process parameters for computation, without the practical significance.

During specific implementation, the actual coordinate of the robot at the $t^{th}$ moment is specifically computed as follows:

S231: It is assumed that the inspection robot R provided with the reader-writer has a coordinate of (x,y), and coordinates of the n label signal sources are $(x_1,y_1)$, $(x_2,y_2)$, $(x_3,y_3)$, ..., $(x_n,y_n)$:

$$\begin{cases} (x_1-x)^2 + (y_1-y)^2 = d_1^2 \\ (x_2-x)^2 + (y_2-y)^2 = d_2^2 \\ (x_3-x)^2 + (y_3-y)^2 = d_3^2 \\ \ldots \\ (x_n-x)^2 + (y_n-y)^2 = d_n^2 \end{cases} \qquad (2\text{-}5)$$

where, $d_1, d_2, d_3, \ldots, d_n$ represent distances from the label signal sources to the inspection robot R, respectively;

S232: Eq. (2-4) is substituted into Eq. (2-5) to obtain:

$$\begin{cases} x_1^2 - x_n^2 - x(x_1-x_n)x - y_1^2 - y_n^2 - 2(y_1-y_n)y = d_1^2 - d_n^2 \\ x_2^2 - x_n^2 - x(x_2-x_n)x - y_2^2 - y_n^2 - 2(y_2-y_n)y = d_2^2 - d_n^2 \\ \ldots \\ x_{n-1}^2 - x_n^2 - x(x_{n-1}-x_n)x - y_{n-1}^2 - y_n^2 - 2(y_{n-1}-y_n)y = d_{n-1}^2 - d_n^2 \end{cases} \qquad (2\text{-}6)$$

Eq. (2-6) is represented with a linear equation as:

$$AX=b \qquad (2\text{-}7)$$

where:

$$A = \begin{bmatrix} 2(x_1-x_n) & 2(y_1-y_n) \\ 2(x_2-x_n) & 2(y_2-y_n) \\ \ldots \\ 2(x_{n-1}-x_n) & 2(y_{n-1}-y_n) \end{bmatrix},$$

-continued $$b = \begin{bmatrix} x_1^2 - x_n^2 + y_1^2 - y_n^2 + d_n^2 - d_1^2 \\ x_2^2 - x_n^2 + y_2^2 - y_n^2 + d_n^2 - d_2^2 \\ x_{n-1}^2 - x_n^2 + y_{n-1}^2 - y_n^2 + d_n^2 - d_{n-1}^2 \end{bmatrix}, X \begin{bmatrix} x \\ y \end{bmatrix}$$

S233: Eq. (2-7) is processed with a standard least squares estimation method to obtain:

$$J = [b - A\hat{X}]^T [b - A\hat{X}] = [b^T - \hat{X}^T A^T][b - A\hat{X}] \quad (2\text{-}8)$$

where, A is a non-singular matrix; M>2, namely an overdetermined system in which a number of equations is greater than a number of unknowns; a reciprocal of $\hat{X}$ is obtained with Eq. (2-8); and $X^T A^T b = b^T A \hat{X}$ leads to:

$$\frac{\partial J}{\partial \hat{X}} = \frac{[b^T b - 2\hat{X}^T A^T b + \hat{X}^T A^T A \hat{X}]}{\partial \hat{X}} = -2A^T b + 2A^T A \hat{X} = 0 \quad (2\text{-}9)$$

A predicted coordinate when the inspection robot reads an nth label is obtained:

$$\hat{X} = (A^T A)^{-1} A^T b \quad (2\text{-}10)$$

S234: An actual coordinate when the inspection robot reads the nth label is computed, the actual coordinate being specifically given by:

$$\begin{cases} x(t) = x(\bar{t}) + v\cos\theta(\bar{t}) \\ y(t) = y(\bar{t}) + v\sin\theta(\bar{t}) \end{cases} \quad (2\text{-}11)$$

where, t represents the $t^{th}$ moment, and $\bar{t}$ represents a time mean from a $(t-1)^{th}$ moment to the $t^{th}$ moment. As the robot moves in real time, time $\Delta t$ is need for the sensor to obtain the wireless signal and for the localization program to compute the position of the robot. As a matter of fact, the position computed at the $t^{th}$ moment is the coordinate $(x_{t-1}, y_{t-1})$ computed according to the information of the sensor at the $(t-1)^{th}$ moment. The robot has the actual coordinate $(x_t, y_t)$ at the $t^{th}$ moment, so the distance moved by the robot within the time $\Delta t$ is a localization error of the mobile robot in real-time localization.

During actual localization, the localization information acquired by the sensor changes to some extent in different environments. In order to reduce the error arising from fluctuations of the wireless signal, signal strengths acquired in unit time are averaged as follows to improve the accuracy:

$$\overline{U} = \sum_i^j RSSI_i \quad (2\text{-}12)$$

where, j represents a number of coordinates computed within the unit time, and $\overline{U}$ represents a coordinate in unit average time.

The averaging method is used during the traveling process of the robot. Therefore, when the robot moves from the point P(t−1) to the point P(t) within the time $\Delta t$, the coordinate computed by the localization system is approximately estimated as the point $P(\bar{t})$ corresponding to $\overline{U} = \Sigma \overline{RSSI}$ at the $\bar{t}$ moment.

S235: Eq. (2-7) is substituted into Eq. (2-11) to obtain Eq. (2-3), Eq. (2-3) being the actual coordinate of the robot at the $t^{th}$ moment.

S240: A model is established with coordinates of the robot in the I moments to obtain an actual path of the robot:

$$RSSI = \{RSSI_x, RSSI_y\} = \{x_1', x_2', \ldots, x_n', y_1', y_2', \ldots, y_n'\} \quad (2\text{-}4)$$

where, $RSSI = \{RSSI_x, RSSI_y\}$ represents the actual path of the robot, which is achieved by modeling the coordinates from the RFID-based localization, and the target set of the neural network; and $RSSI_x$ and $RSSI_y$ represent an x coordinate and a y coordinate computed through the RFID-based localization.

S250: An actual path of the robot in the I moments is obtained with the method in S210-S240.

S300: Positional information moved by the robot at the $t^{th}$ moment is computed:

$$f(S_t, u_{t-1}) = \begin{cases} x_t + \frac{\Delta D_t}{\Delta \theta_t}[\sin(\theta_t + \Delta\theta_t) - \sin\theta_t] \\ y_t = \frac{\Delta D}{\Delta \theta_t}[\cos(\theta_t + \Delta\theta_t) - \cos\theta_t] \\ \theta_t + \Delta\theta \end{cases}, |\Delta\theta_t| > 0 \quad (3\text{-}1)$$

where, $u_t = (\Delta D_t, \Delta \theta_t)^T$ represents a pose increment, $S_t = (x_t, y_t, \theta_t)$ represents a state of the robot at the $t^{th}$ moment, (x,y) represents a coordinate of the robot at the $t^{th}$ moment, $\theta$ represents a direction angle at the $t^{th}$ moment, $\Delta D_t$ is an arc length moved by the robot within time $\Delta t$, and $\Delta \theta_t$ is a change of a direction angle in a pose of the robot within the time $\Delta t$.

During specific implementation, the positional information moved by the robot is specifically computed as follows:

S310: A 360 PPR incremental photoelectric encoder capable of outputting a dual pulse spaced at 90° is provided, and thus a rotation direction of a wheel can be known through a phase change of the dual pulse. The photoelectric encoder is provided on a shaft extension of a drive motor to directly measure the rotation of the motor. The motor drives the wheel through a 15-fold decelerator, which means that when the wheel rotates one revolution, the motor rotates 15 revolutions. While the wheel has a diameter of 250 mm, a theoretical resolution of an odometer is computed:

$$\delta = \frac{\pi D}{\eta P} = \frac{3.14 \times 250}{15 \times 360} = 0.14537 \text{ (mm)} \quad (3\text{-}2)$$

where, $\delta$ represents the resolution of the odometer, D represents the diameter (mm) of the wheel, $\eta$ represents a reduction ratio of the drive motor, and P represents an accuracy of the encoder.

S320: Assuming that a sampling interval is $\Delta t$, a displacement increment $\Delta d_L (\Delta d_R)$ of a left (right) wheel is computed:

$$\Delta d_L = \delta \cdot N_L \quad (3\text{-}3)$$

where, $N_L(N_R)$ represent a pulse increment output by a photoelectric encoder on the left (right) drive wheel.

S330: The robot moves from the state $S_{t-1} = (x_{t-1}, y_{t-1}, \theta_{t-1})$ at the $(t-1)^{th}$ moment to the state $S_t = (x_t, y_t, \theta_t)$ at the $t^{th}$ moment, and the pose increment of the robot is computed with the displacement increment of the wheel:

$$\begin{cases} \Delta D_t = (\Delta d_L + \Delta d_R)/2 \\ \Delta \theta_t = (\Delta d_R - \Delta d_L)/\beta \end{cases} \quad (3\text{-}4)$$

where, β represents a distance between the left drive wheel and the right drive wheel.

S340: In case of a difference |Δθ_t|>0 between direction angles at an end pose and a start pose of the robot, the positional information of the robot is obtained.

S400: The positional information of the robot at the $t^{th}$ moment in Step S300 is processed with a GLM to obtain a predicted path of the robot at the $t^{th}$ moment:

$$GLM=\{x_1, x_2, \ldots, x_n, y_1, y_2, \ldots, y_n\} \quad (4\text{-}1)$$

where, $x_{1\ldots n}$ is an x coordinate of the predicted path estimated by the GLM, and $y_{1\ldots n}$ is a y coordinate of the predicted path estimated by the GLM, thereby obtaining a predicted path corresponding to each moment.

S500: An odometry error model is established with the neural network in the prior art:

$$E=\Sigma_n |O-\text{RSSI}|^2 \quad (5\text{-}1)$$

where, O represents an optimized predicted path, namely an optimized output result after the predicted path is trained by the neural network.

Figure 2:
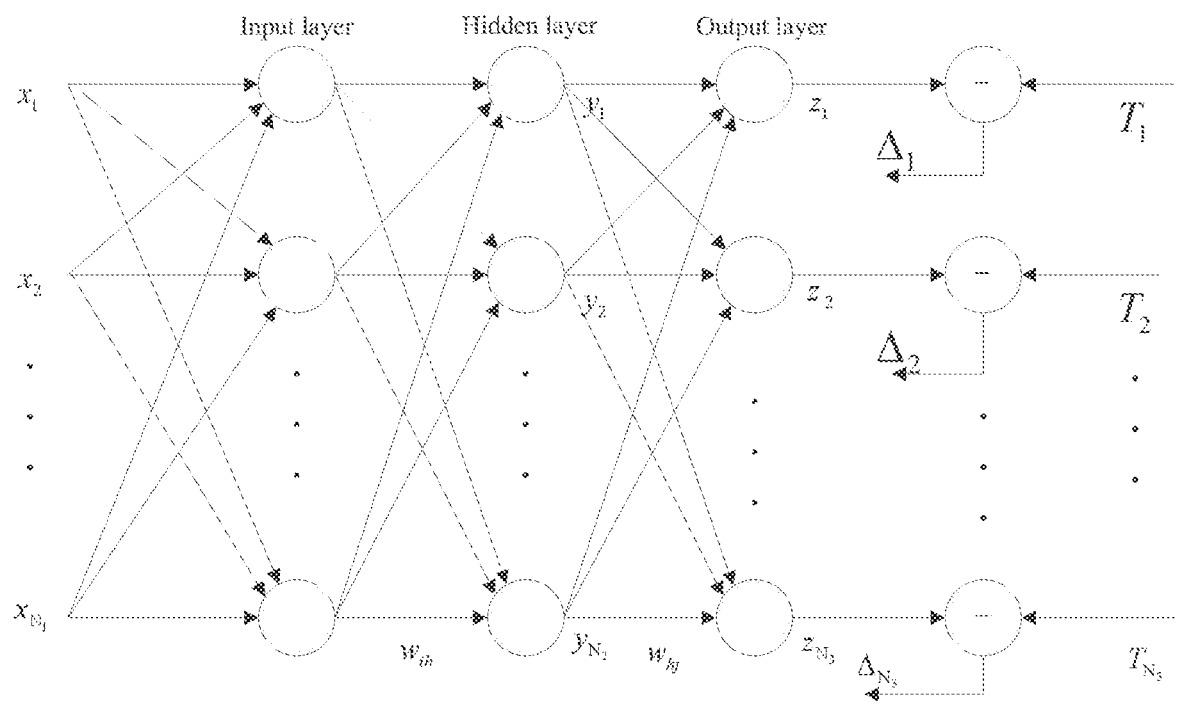
FIG. 2 is a structural view of a BP neural network.

Referring to FIG. 2, during specific implementation, the odometry error model E is specifically established as follows:

S510: It is assumed that the neural network structurally includes an input layer having q neurons, a hidden layer l having neurons, and an output layer having m neurons, connections between the neurons of the input layer and the neurons of the hidden layer each have a weight value of $w_{ij}$, connections between the neurons of the hidden layer and the neurons of the output layer each have a weight value of $w_{jk}$, the hidden layer has a bias term of a, and the output layer has a bias term of b.

S520: The GLM is taken as an input of the neural network to obtain an output result of the hidden layer:

$$H_i = f\left(\sum_{i=1}^{q} w_{ij} p_i - a_j\right) j = 1, 2, \ldots, l \quad (5\text{-}2)$$

where, $p_i$ represents a vector for coordinates $(x_{n-1}, y_{n-1})$ and $(x_n, y_n)$ of the input GLM, f represents an activation function, and i={1, 2, . . . , q}, j={1, 2, . . . , l}. In the embodiment, the activation function is the sigmoid function and is specifically expressed as:

$$f(x) = \frac{1}{1+e^{-x}} \quad (5\text{-}3)$$

Considering that the number of nodes on the hidden layer of the neural network has a certain impact on the final result, the number of nodes on the hidden layer is optimized:

$$l=\sqrt{q+m}+\zeta, \zeta \in [1,10] \quad (5\text{-}4)$$

where, l represents a number of neurons on the hidden layer. In the embodiment, the best performance can be obtained with l=13.

A result from the output layer of the neural network is:

$$O = \sum_{j=1}^{l} H_i w_{jk} - b_k = \{\hat{x}_1, \hat{x}_2, \ldots, \hat{x}_n, \hat{y}_1, \hat{y}_2, \ldots, \hat{y}_n\} \quad (5\text{-}5)$$

$k = 1, 2, \ldots m$.

S530: The result from the output layer of the neural network at the $t^{th}$ moment and the actual path at the present moment are taken as an input of a loss function to establish the odometry error model E.

S600: A maximum number of iterations is preset, the actual path in the I moments and a corresponding predicted path are taken as an input of a neural network model to train the error model E, parameters of the model are updated through BP during training, and training is stopped when $E \leq e^{-5}$ to obtain a well-trained odometry error model. The odometry error model of the robot is nonlinear. The neural network is widely recognized as a nonlinear modeling tool. The two-layer feed-forward neural network is used in the odometry error model of the robot, and sensory and perceptual training is performed on the two layers with a BP algorithm. The working principle of the BP is to apply the descent rule to the feed-forward network and optimize network parameters.

S700: Steps S300-S400 are repeated to obtain a predicted traveling path of a robot R' to be predicted, and the predicted traveling path is input to the well-trained odometry error model in Step S600 to obtain an optimized predicted traveling path that is a predicted value for the traveling path of the robot R'.

As can be seen from the above embodiments, compared with the predicted path processed by the GLM, the final position of the robot estimated with the neural network is almost the same as the actual position of the robot computed with the RFID-based localization, as shown in FIG. 3-*a* and FIG. 3-*a*. Therefore, the odometry calibration method for the indoor inspection robot based on the neural network can minimize the error of the odometer.

Finally, it should be noted that the above embodiment is only intended to explain, rather than to limit, the technical solution of the present disclosure. Although the present disclosure is described in detail with reference to the preferred embodiment, those ordinarily skilled in the art should understand that modifications or equivalent substitutions made to the technical solutions of the present disclosure without departing from the spirit and scope of the technical solution of the present disclosure should be included within the scope of the claims of the present disclosure.

What is claimed is:

1. A neural network-based method for calibration and localization of an indoor inspection robot, comprising the following steps:

S100: presetting indoor positions for N label signal sources, the label signal sources being capable of transmitting radio frequency (RF) signals;

S200: providing a reader-writer for receiving the signals of the label signal sources on an indoor robot, and computing, during an indoor traveling process of the robot, an actual path of the robot according to numbers of signal labels received by the reader-writer at different moments, specifically:

S210: establishing a log-normal propagation loss model according to a signal strength of received labels:

$$P(d)=P(d_0)-10\alpha \log(d/d_0)-X_\sigma \quad (2\text{-}1)$$

wherein, P(d) represents a signal strength from labels received by a reader, $P(d_0)$ represents a signal strength from labels received by the reader at a reference point $d_0$, α represents a scale factor between a path length and a path loss, $X_\sigma$ represents a Gaussian random variable having an average of 0, $d_0$ represents a distance from the reference point to each of the labels, and d represents a distance from a label to be computed to the reader;

S220: obtaining a distance d from each of the label signal sources to the reader-writer by transforming eq. (2-1):

$$d=10^{[P(d_0)-P(d)]/10\alpha} \qquad (2\text{-}2)$$

wherein, $P(d_0)$ represents a signal strength at 1 m, and $\alpha$ represents a signal propagation constant;

S230: randomly selecting I moments within a time interval T, and assuming that a number of label signals received by the reader-writer at a $t^{th}$ moment is n, then computing an actual coordinate of the robot at the $t^{th}$ moment as:

$$\hat{X}_t = \begin{bmatrix} x(t) \\ y(t) \end{bmatrix} \qquad (2\text{-}3)$$

$$= \begin{bmatrix} 8 \times \dfrac{\begin{pmatrix} NK_1E_{x1} - KK_1E_{y1} + \\ NK_2E_{x2} - KK_2E_{y2} + \ldots + \\ NK_nE_{xn-1} - KK_nE_{yx-1} \end{pmatrix}}{MN - K^2} + v\cos\theta(\overline{t}) \\ 8 \times \dfrac{\begin{pmatrix} NK_1E_{x1} - KK_1E_{y1} + \\ NK_2E_{x2} - KK_2E_{y2} + \ldots + \\ NK_nE_{xn-1} - KK_nE_{yx-1} \end{pmatrix}}{MN - K^2} + v\sin\theta(\overline{t}) \end{bmatrix}$$

wherein, $E_{x1}=x_1-x_n, E_{x2}=x_2-x_n, \ldots, E_{xn-1}=x_{n-1}-x_n;$ $E_{y1}=y_1-y_n, E_{y2}=y_2-y_n, \ldots, E_{yn-1}=y_{n-1}-y_n;$ $K=(x_1-x_n)(y_1-y_n)+(x_2-x_n)(y_2-y_n)+\ldots+(x_{n-1}-x_n)(y_{n-1}-y_n);$ $K_1=x_1^2-x_4^2+y_1^2-y_4^2+d_4^2-d_1^2;$ $K_2=x_2^2-x_4^2+y_2^2-y_4^2+d_4^2-d_2^2;$ $K_n=x_{n-1}^2-x_n^2+y_{n-1}^2-y_n^2+d_n^2-d_{n-1}^2;$ $M=(x_1-x_4)^2+(x_2-x_4)^2+\ldots+(x_{n-1}-x_n)^2;$ $N=(y_1-y_4)^2+(y_2-y_4)^2+\ldots+(y_{n-1}-y_n)^2;$ S240: establishing a model with coordinates of the robot in the I moments to obtain an actual path of the robot:

$$\text{RSSI}=\{\text{RSSI}_x, \text{RSSI}_y\}=\{x_1', x_2', \ldots, x_n', y_1', y_2', \ldots, y_n'\} \qquad (2\text{-}4)$$

wherein, $\text{RSSI}=\{\text{RSSI}_x, \text{RSSI}_y\}$ represents the actual path of the robot, and $\text{RSSI}_x$ and $\text{RSSI}_y$ represent an x coordinate and a y coordinate computed through RF identification (RFID)-based localization; and S250: obtaining an actual path of the robot in the I moments with the method in S210-S240;

S300: computing positional information moved by the robot at the $t^{th}$ moment:

$$f(S_t, u_{t-1}) = \begin{cases} x_t + \dfrac{\Delta D_t}{\Delta \theta_t}[\sin(\theta_t + \Delta\theta_t) - \sin\theta_t] \\ y_t - \dfrac{\Delta D_t}{\Delta \theta_t}[\cos(\theta_t + \Delta\theta_t) - \cos\theta_t] \\ \theta_t + \Delta\theta_t \end{cases}, |\Delta\theta_t| > 0 \qquad (3\text{-}1)$$

wherein, $u_t = (\Delta D_t, \Delta\theta_t)^T$ represents a pose increment, $S_t = (x_t, y_t, \theta_t)$ represents a state of the robot at the $t^{th}$ moment, (x,y) represents a coordinate of the robot at the $t^{th}$ moment, $\theta$ represents a direction angle at the $t^{th}$ moment, $\Delta D_t$ is an arc length moved by the robot within time $\Delta_t$, and $\Delta\theta_t$ is a change of a direction angle in a pose of the robot within the time $\Delta t$;

S400: processing the positional information of the robot at the $t^{th}$ moment in step S300 with a generalized linear model (GLM) to obtain a predicted path of the robot at the $t^{th}$ moment:

$$\text{GLM}=\{x_1, x_2, \ldots, x_n, y_1, y_2, \ldots, y_n\} \qquad (4\text{-}1)$$

wherein, $x_{1 \ldots n}$ is an x coordinate of the predicted path estimated by the GLM, and $y_{1 \ldots n}$ is a y coordinate of the predicted path estimated by the GLM, thereby obtaining a predicted path corresponding to each moment;

S500: establishing an odometry error model E with the neural network:

$$E=\Sigma_n|O-\text{RSSI}|^2 \qquad (5\text{-}1)$$

wherein, O represents an optimized predicted path;

S600: presetting a maximum number of iterations, taking the actual path in the I moments and a corresponding predicted path as an input of a neural network model to train the error model E, updating parameters of the model through back propagation (BP) during training, and stopping training when $E \leq e^{-5}$ to obtain a well-trained odometry error model; and S700: repeating steps S300-S400 to obtain a predicted traveling path of a robot R' to be predicted, and inputting the predicted traveling path to the well-trained odometry error model in step S600 to obtain an optimized predicted traveling path that is a predicted value for a traveling path of the robot R'.

2. The neural network-based method for calibration and localization of an indoor inspection robot according to claim 1, wherein the computing an actual coordinate of the robot at the $t^{th}$ moment in step S230 specifically comprises:

S231: assuming that an inspection robot R provided with the reader-writer has a coordinate of (x,y), and coordinates of the n label signal sources are $(x_1, y_1), (x_2, y_2), (x_3, y_3), \ldots, (x_n, y_n)$:

$$\begin{cases} (x_1-x)^2 + (y_1-y)^2 = d_1^2 \\ (x_2-x)^2 + (y_2-y)^2 = d_2^2 \\ (x_3-x)^2 + (y_3-y)^2 = d_3^2 \\ \ldots \\ (x_n-x)^2 + (y_n-y)^2 = d_n^2 \end{cases} \qquad (2\text{-}5)$$

wherein, $d_1, d_2, d_3, \ldots, d_n$ represent distances from the label signal sources to the inspection robot R, respectively;

S232: substituting eq. (2-4) into eq. (2-5) to obtain:

$$\begin{cases} x_1^2 - x_n^2 - x(x_1-x_n)x + y_1^2 - y_n^2 - 2(y_1-y_n)y = d_1^2 - d_n^2 \\ x_2^2 - x_n^2 - x(x_2-x_n)x + y_2^2 - y_n^2 - 2(y_2-y_n)y = d_2^2 - d_n^2 \\ \ldots \\ x_{n-1}^2 - x_n^2 - x(x_{n-1}-x_n)x + y_{n-1}^2 - y_n^2 - 2(y_{n-1}-y_n)y = d_{n-1}^2 - d_n^2 \end{cases} \qquad (2\text{-}6)$$

representing eq. (2-6) with a linear equation as:

$$AX=b \qquad (2\text{-}7)$$

wherein:

$$A = \begin{bmatrix} 2(x_1-x_n) & 2(y_1-y_n) \\ 2(x_2-x_n) & 2(y_2-y_n) \\ \cdots \\ 2(x_{n-1}-x_n) & 2(y_{n-1}-y_n) \end{bmatrix},$$

$$b = \begin{bmatrix} x_1^2 - x_n^2 + y_1^2 - y_n^2 + d_n^2 - d_1^2 \\ x_2^2 - x_n^2 + y_2^2 - y_n^2 + d_n^2 - d_2^2 \\ x_{n-1}^2 - x_n^2 + y_{n-1}^2 - y_n^2 + d_n^2 - d_{n-1}^2 \end{bmatrix}, X = \begin{bmatrix} x \\ y \end{bmatrix}$$

S233: processing eq. (2-7) with a standard least squares estimation method to obtain:

$$J = [b - A\hat{X}]^T[b - A\hat{X}] = [b^T - \hat{X}^T A^T][b - A\hat{X}] \quad (2\text{-}8)$$

wherein, A is a non-singular matrix; M>2, namely an overdetermined system in which a number of equations is greater than a number of unknowns; a reciprocal of $\hat{X}$ is obtained with eq. (2-8); and $X^T A^T b = b^T A \hat{X}$ leads to:

$$\frac{\partial J}{\partial \hat{X}} = \frac{\left[b^T b - 2\hat{X}^T A^T b + \hat{X}^T A^T A \hat{X}\right]}{\partial \hat{X}} = -2A^T b + 2A^T A \hat{X} = 0 \quad (2\text{-}9)$$

obtaining a predicted coordinate when the inspection robot reads an nth label:

$$\hat{X} = (A^T A)^{-1} A^T b \quad (2\text{-}10)$$

S234: computing an actual coordinate when the inspection robot reads the nth label, the actual coordinate being specifically given by:

$$\begin{cases} x(t) = x(\bar{t}) + v\cos\theta(\bar{t}) \\ y(t) = y(\bar{t}) + v\sin\theta(\bar{t}) \end{cases} \quad (2\text{-}11)$$

wherein, t represents the $t^{th}$ moment, and $\bar{t}$ represents a time mean from a $(t-1)^{th}$ moment to the $t^{th}$ moment; and S235: substituting eq. (2-7) into eq. (2-11) to obtain eq. (2-3), eq. (2-3) being the actual coordinate of the robot at the $t^{th}$ moment.

3. The neural network-based method for calibration and localization of an indoor inspection robot according to claim 2, wherein the computing positional information moved by the robot in step S300 specifically comprises:

S310: computing a theoretical resolution of an odometer:

$$\delta = \frac{\pi D}{\eta P} = \frac{3.14 \times 250}{15 \times 360} = 0.14537 \text{ (mm)} \quad (3\text{-}2)$$

wherein, δ represents the theoretical resolution of the odometer, D represents a diameter (mm) of a wheel, η represents a reduction ratio of a drive motor, and P represents an accuracy of an encoder;

S320: assuming that a sampling interval is Δt, then computing a displacement increment $\Delta d_L(\Delta d_R)$ of a left (right) wheel:

$$\Delta d_L = \delta \cdot N_L \quad (3\text{-}3)$$

wherein, $N_L(N_R)$ represent a pulse increment output by a photoelectric encoder on the left (right) drive wheel;

S330: computing the pose increment of the robot with the displacement increment of the wheel:

$$\begin{cases} \Delta D_t = (\Delta d_L + \Delta d_R)/2 \\ \Delta \theta_t = (\Delta d_R - \Delta d_L)/\beta \end{cases} \quad (3\text{-}4)$$

wherein, β represents a distance between the left drive wheel and the right drive wheel; and S340: obtaining, in case of a difference $|\Delta\theta_t|>0$ between direction angles at an end pose and a start pose of the robot, the positional information of the robot.

4. The neural network-based method for calibration and localization of an indoor inspection robot according to claim 3, wherein the establishing an odometry error model E in step S500 specifically comprises:

S510: assuming that the neural network structurally comprises an input layer having q neurons, a hidden layer having l neurons, and an output layer having m neurons, connections between the neurons of the input layer and the neurons of the hidden layer each have a weight value of $w_{ij}$, connections between the neurons of the hidden layer and the neurons of the output layer each have a weight value of $w_{jk}$, the hidden layer has a bias term of a, and the output layer has a bias term of b;

S520: taking the GLM as an input of the neural network to obtain an output result of the hidden layer:

$$H_j = f\left(\sum_{i=1}^{q} w_{ij} p_i - a_j\right) j = 1, 2, \ldots, l \quad (5\text{-}2)$$

wherein, $p_i$ represents a vector for coordinates $(x_{n-1}, y_{n-1})$ and $(x_n, y_n)$ of the input GLM, f represents an activation function, and i={1, 2, ..., q}, j={1, 2, ..., l}; and a result from the output layer of the neural network is:

$$O = \sum_{j=1}^{l} H_j w_{jk} - b_k = \{\hat{x}_1, \hat{x}_2, \ldots, \hat{x}_n, \hat{y}_1, \hat{y}_2, \ldots, \hat{y}_n\} \quad (5\text{-}5)$$

$$k = 1, 2, \ldots m$$

and

S530: taking the result from the output layer of the neural network at the $t^{th}$ moment and the actual path at a present moment as an input of a loss function to establish the odometry error model E.

* * * * *